United States Patent [19]

Hujer

[11] 4,260,245
[45] Apr. 7, 1981

[54] APPARATUS FOR MAKING TEST EXPOSURES ON MARGINAL PORTIONS OF PHOTOGRAPHIC FILMS OR THE LIKE

[75] Inventor: Friedrich Hujer, Grünwald, Fed. Rep. of Germany

[73] Assignee: Agfa-Gevaert Aktiengesellschaft, Leverkusen, Fed. Rep. of Germany

[21] Appl. No.: 5,515

[22] Filed: Jan. 22, 1979

[30] Foreign Application Priority Data

Jan. 26, 1978 [DE] Fed. Rep. of Germany ...... 2803380

[51] Int. Cl.³ .................. G03B 15/00; G03B 27/32
[52] U.S. Cl. ............................ 355/40; 355/64
[58] Field of Search .............. 355/39, 43, 40, 41, 355/64; 354/105, 106, 109

[56] References Cited

U.S. PATENT DOCUMENTS

| | | | |
|---|---|---|---|
| 1,431,893 | 10/1922 | Jones | 354/105 |
| 2,753,757 | 7/1956 | Roth | 355/41 |
| 3,354,777 | 11/1967 | Normandy et al. | 355/64 |
| 3,645,619 | 2/1972 | Burton et al. | 355/40 |
| 3,718,074 | 2/1973 | Davis | 354/109 |
| 3,898,002 | 8/1975 | Kinder et al. | 355/41 X |
| 4,079,388 | 3/1978 | Takahama et al. | 354/105 X |
| 4,089,018 | 5/1978 | Asano | 354/106 |

FOREIGN PATENT DOCUMENTS 1447528 6/1963 Fed. Rep. of Germany ............ 355/40
2614965 10/1977 Fed. Rep. of Germany ............ 355/41

Primary Examiner—Donald A. Griffin
Attorney, Agent, or Firm—Peter K. Kontler

[57] ABSTRACT

Apparatus for exposing a gray sample onto the unexposed perforated marginal portion of a web of photographic film has a drum over which the web is trained while moving lengthwise, and a device which monitors the web and generates a signal on detection of successive or selected perforations. Such signals are delayed for an interval of time which insures that a field which is to be provided with a test exposure and is located at a predetermined distance from the perforation which has caused the generation of a signal is located in the range of an imaging system operating with a flash unit to expose the sample onto the aforementioned field. The delay can be effected by a computer which receives the aforementioned signals and which further receives signals denoting incremental advances of the web through distances of selected unit length. The test exposures are used in the copying machine for comparison with a color chart to insure proper selection of intervals during which the film frames are exposed to light of various colors.

24 Claims, 3 Drawing Figures

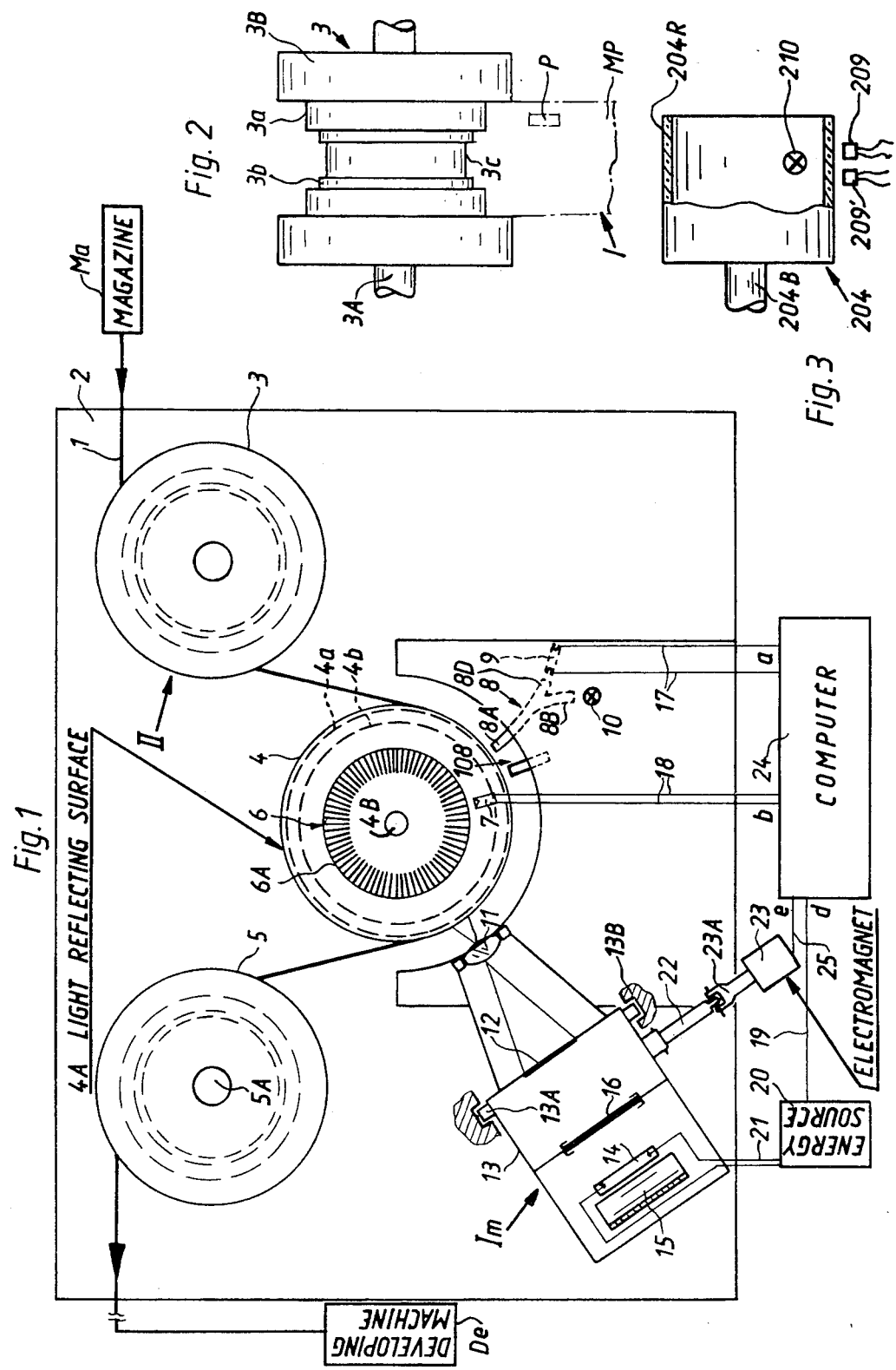

APPARATUS FOR MAKING TEST EXPOSURES ON MARGINAL PORTIONS OF PHOTOGRAPHIC FILMS OR THE LIKE

BACKGROUND OF THE INVENTION

The present invention relates to apparatus for making test exposures on webs of photosensitive material, particularly for applying test exposures to unexposed fields of photographic films having perforated marginal portions and exposed film frames.

German Offenlegungsschrift No. 1,447,528 discloses the possibility of making test exposures between the perforations in marginal portions or zones of color photographic negatives. Such test exposures are to be used to facilitate the selection of appropriate filters and are to be applied prior to transport of photographic film with exposed film frames through a developing machine. The selection of filter is to be made prior to the making of color prints and should involve the comparison of developed test exposures with a color chart. The aforementioned German printed publication does not disclose any means for applying test exposures to the marginal portions or zones of color film negatives.

The making of test exposures of marginal portions or zones of photographic films with exposed film frames must be carried out with a high degree of accuracy because certain portions of such marginal zones are removed as a result of the making of perforations for film transport and certain other portions of such marginal zones are provided with lettering or other symbols which are normally exposed on photographic film. Thus, the space which is available for the application of test exposures is limited which, in turn, necessitates the making of such exposures with an extremely high degree of accuracy. A very high degree of accuracy is desirable on the additional ground that the test exposures must be detected in a fully automatic way for the purpose of comparison with the aforediscussed color chart. Thus, when a film, one marginal zone or portion of which has test exposures applied thereto, enters the copying apparatus, the locus of test exposures must be ascertained by automatic detector means in order to insure that the copying operation will be carried out at a high speed and will result in the making of acceptable prints. Still further, the color temperature of fields which are provided with test exposures must be constant in order to insure that such test exposures will be capable of adequately serving their purpose in connection with determination of the quantities of printing light in various colors.

OBJECTS AND SUMMARY OF THE INVENTION

An object of the invention is to provide a novel and improved apparatus for making test exposures on perforated marginal zones or other portions of webs of photosensitive material, especially photographic color films with exposed but undeveloped film frames.

Another object of the invention is to provide a simple, compact and relatively inexpensive apparatus which can be installed in or integrated into a processing machine for photosensitive material, e.g., into a developing machine for exposed customer films or into a machine which splices customer films end-to-end prior to introduction of films into a developing machine in a photographic processing laboratory.

A further object of the invention is to provide an apparatus which can be used for the application of test exposures to different types of photosensitive material, particularly to photographic films having different thicknesses and/or widths.

An additional object of the invention is to provide an apparatus which can apply test exposures to free portions or fields of marginal zones of photographic films or the like with a high degree of accuracy and predictability so that such test exposures can be readily detected or their positions anticipated preparatory to the making of a comparison with a color chart for selection of appropriate filters and/or quantities of printing light in a copying machine.

Another object of the invention is to provide an apparatus which can apply test exposures while the web of photographic material is in motion.

A further object of the invention is to provide an apparatus which invariably applies test exposures at a predetermined distance from selected marginal perforations of the web.

The invention is embodied in an apparatus for applying test exposures (i.e., images of a selected sample) to a perforated marginal zone or another portion of a web of photographic material, particularly to an unexposed marginal portion of a color photographic film. The apparatus comprises means for advancing the web lengthwise along a predetermined path (such advancing means may comprise a substantially drum-shaped or cylinder-shaped rotary element and two rotary guide members which flank the rotary element and insure (with or without the rotary element) that the perforations of the marginal portion are caused to travel along a predetermined portion of the aforementioned path during movement along the peripheral surface of the rotary element), signal generated means for monitoring the marginal portion of the advancing web for the presence of perforations in a first portion of the predetermined path (namely, in the region where the web contacts the peripheral surface of the aforementioned rotary element), imaging means which is actuatable to expose the image of a suitable sample (e.g., a so-called gray ladder whose density values correspond to the exposure range of the web) onto the marginal portion or another unexposed portion of the advancing web in a second portion of the path which is located downstream of the first portion, and control means which is interposed between the monitoring means and the imaging means to actuate the imaging means with a delay which follows the generation of a signal denoting the detection of a perforation (e.g., of each of a series of successive perforations or of each $n^{th}$ perforation) and during which the detected perforation advances through a predetermined distance along the path. This insures that each test exposure can be made on a predetermined field of the previously unexposed marginal portion or another portion and at such a distance from the corresponding perforation that the test exposure can be readily located in the copying machine.

The control means may comprise a pulse generator which is operative to transmit second signals in response to incremental advances of the web through preselected unit distances along the path, and a computer or other suitable means for processing the first mentioned and second signals for the purpose of actuating the imaging means when a field of the marginal portion or another unexposed web portion which is to be provided with a test exposure and is located at a known or desired distance from the perforation whose detection resulted in the generation of a first mentioned signal is in register with the imaging means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic elevational view of an apparatus which embodies one form of the invention;

FIG. 2 is a side elevational view of a component of the web advancing means as seen in the direction of arrow II in FIG. 1; and FIG. 3 is a partly elevational and partly sectional view of a modified rotary element which forms part of the web advancing means.

DESCRIPTION OF THE PREFERRED EMBODIMENTS

The apparatus which is shown in FIG. 1 comprises a housing or enclosure 2 which can be installed or incorporated in a film processing machine, e.g., in a developing machine for exposed customer films or in a machine which splices customer films end-to-end prior to introduction into a developing machine in a photographic processing laboratory. The housing 2 contains means for advancing a web 1 of photographic material, particularly an exposed but undeveloped customer film, along an elongated path wherein the web or film 1 moves lengthwise in the direction indicated by arrows, i.e., from the right to the left, as viewed in FIG. 1. FIG. 1 further shows a customary magazine Ma which dispenses the web 1 and which is provided with means for storing a certain length of photographic material to avoid stoppages of webs 1 in the housing 2 during clamping of the trailing end of a preceding web to the leader of the next following web. The web 1 which leaves the housing 2 enters the liquid-containing tank or tanks of a developing machine De. As mentioned above, the housing 2 can be incorporated in the machine De or in a film splicing machine, not shown.

The purpose of the apparatus which includes the housing 2 is to provide an unexposed marginal portion MP or another unexposed portion of the web 1 with test exposures constituting images of a sample 12 which is installed in the casing 13 of an imaging device Im in the housing 2. Test exposures are assumed to be made between the customary perforations P of the marginal portion MP, such marginal portion being shown in FIG. 2 wherein a portion of the web 1 is illustrated by phantom lines. It is not absolutely necessary that the test exposures be made in the marginal portion MP. The making of test exposures can involve the imaging of a sample of predetermined color composition, especially with neutral grey. In accordance with the disclosure of the commonly owned copending application Ser. No. 5,514 filed Jan. 22, 1979 by Siegfried Thurm et. al., the sample 12 may constitute a gray ladder whose density values overlap the exposure range of the material of the web 1.

The aforementioned advancing means for the web 1 comprises a rotary element 4 here shown as a substantially cylindrical drum 4 which rotates clockwise, as viewed in FIG. 1, and is flanked by two rotary guide members 3 and 5 each of which is preferably a roll of the type shown in FIG. 2. The web 1 which advances from the magazine Ma toward the tank or tanks of the developing machine De is trained over the guide roll 3, thereupon around the drum 4 (preferably in such a way that the peripheral surface 4A of the drum 4 is contacted along an arc of approximately 180 degrees), and thereupon around the guide roll 5. The latter is preferably identical with the guide roll 3 the details of which are shown in FIG. 2.

The guide roll 3 of FIG. 2 is mounted on a shaft 3A which is journalled in the housing 2. The peripheral surface 3B of the guide roll 3 has a relatively wide circumferential groove 3a whose bottom surface is formed with a narrower circumferential groove 3b, and the bottom surface of the groove 3b is formed with a still narrower circumferential groove 3c. Thus, each narrower groove (3b, 3c) is confined by a wider groove (3a, 3b). The width of each groove corresponds to the width of a different web. Thus, the roll 3 can properly guide three different types of exposed but undeveloped customer films, e.g., those known as "110", "126" and "135". The depth of the groove 3b and/or 3c need not match the depth of the groove 3a, and the depth of the groove 3b can deviate from that of the groove 3c. Moreover, the groove 3b and/or 3c need not be disposed symmetrically within the confines of the groove 3a and/or 3b. All that counts is to insure that the perforations P of the marginal portion MP of a film which is trained over the guide roll 3 advance along a predetermined path so that such perforations can be detected by the corresponding monitoring device of the improved apparatus. If the rows of perforations of different types of films travel along one and the same path, the apparatus can employ a single monitoring means or a series of discrete monitoring means which are disposed one behind the other and are aligned with each other, as considered in the longitudinal direction of the web 1. If the paths for the rows of perforations in different types of webs do not coincide with each other, the distances between such paths are indicative of the types of webs which happen to be processed in the apparatus, i.e., the type of web can be ascertained by pinpointing that monitoring means which transmits signals denoting the detection of perforations in the running web which passes through the housing 2.

The guide roll 5 is identical with the guide roll 3 and its circumferential grooves (indicated by broken lines) are aligned with the corresponding grooves 3a, 3b, 3c of the roll 3. The means for driving the advancing means 3-5 may include the shaft 5A of the guide roll 5 and/or one or more pairs of rolls in another part of the developing machine De.

The peripheral surface 4A of the drum 4 is a strongly light-reflecting smooth surface which moves with the web 1. This surface may but need not be provided with circumferential grooves for proper guidance of the selected web 1. It has been found that, if the guide rolls 3 and 5 are placed sufficiently close to the drum 4, the latter need not be formed with any grooves, i.e., the surface 4A may constitute a smooth cylindrical surface extending from the one to the other axial end of the drum 4. However, it is also within the purview of the invention to employ a drum whose peripheral surface is formed with one or more circumferential grooves to insure a highly accurate guidance of a selected web 1 during travel past the monitoring and imaging stations. Two circumferential grooves of the drum 4 are indicated by broken lines, as at 4a and 4b. The narrower groove 4b is located within the confines of the wider groove 4b, the same as shown for the grooves 3a–3c of FIG. 2. Circumferential grooves in the surface 4A will be provided when one or both guide rolls 3, 5 are remote from the drum 4 or under certain other circumstances which render it necessary to reduce the likelihood of wobbling of the web 1, as considered in the axial direction of the drum 4.

The surface 4A of the drum 4 is preferably designed to insure pronounced reflection of infrared light. Such light is supplied by a source 10 which is adjacent to the end face of a branch 8B of an Y-shaped light conductor 8 having a base 8A which directs a beam of infrared light against the marginal portion MP of the web 1 in the region where the web contacts the surface 4A. A second branch 8D of the light conductor 8 is adjacent to a sensor 9, e.g., an optoelectrical transducer which transmits electric signals when the light beam issuing from the source 10, passing through the branch 8B and base 8A and normally impinging upon the marginal portion MP can impinge upon the surface 4A because a perforation P happens to be in register with the end face of the base 8A. The surface portion behind the perforation P reflects light into the base 8A and such light impinges upon the sensor 9 of infrared light so that the latter transmits a readily detectable signal which is processed by a control circuit including a computer 24. The conductor means connecting the sensor 9 with the computer 24 is shown at 17.

The distance between the base 8A of the light conductor 8 and the marginal portion MP of the web 1 in the path which is defined by the guide rolls 3, 5 and drum 4 is preferably minimal. Thus, and if the thickness of all webs having a predetermined width is not uniform, the distance between the peripheral surface 4A and the base 8A of the light conductor 8 only slightly exceeds the maximum thickness of a web 1 having a given width, namely, a width which is such that the perforations of such web can be detected by the monitoring means including the source 10, light conductor 8 and sensor 9. The light conductor 8 consists of a plurality of light-conducting filaments which penetrate into each other at the end face of the base 8A so that light which is reflected by a portion of the surface 4A behind the adjacent perforation P is conveyed by the branch 8D and causes the sensor 9 to generate a readily detectable signal.

The monitoring means may include several light conductors and several sensors, one for each of different types of webs which can be provided with test exposures in the apparatus of FIG. 1. A portion of a second light-conductor 108 is shown in FIG. 1 by broken lines. The base of this conductor is adjacent to the path of perforations which are provided in a web extending into the groove 3b or 3c of the guide roll 3, one branch of the conductor 108 is adjacent to the source 10 (or to a separate source), and the other branch of the conductor 108 is adjacent to the corresponding sensor (not shown). The bases of the light conductors are offset with respect to each other, as considered in the axial direction of the drum 4. The ability of the surface 4A to reflect infrared light is much more pronounced than the reflection of infrared light which impinges upon the marginal portion MP of a web; therefore, the sensor or sensors of the monitoring means can generate and transmit signals which can be readily detected by the computer 24. Such signals persist while a perforation P travels past the base of the respective light conductor so that the computer 24 can also record the duration of each signal, i.e., the length of the detected perforation if the web is advanced at a constant speed.

The control system of the apparatus further includes means for tracking the progress of a perforation P along the path which is defined by the guide rolls 3, 5 and drum 4. Such tracking means comprises a pulse generator which transmits (second) signals to the corresponding input b of the computer 24 via conductor means 18. The pulse generator which is shown in FIG. 1 comprises a disc 6 which is formed with radially extending marginal slots 6A, and a transducer 7 (e.g., a photoelectric detector) which transmits a second signal in response to detection of each slot 6A or in response to detection of each rib or spoke between two neighboring slots 6A. For example, the sensitivity of the pulse generator can be selected in such a way that the transducer 7 transmits a second signal in response to each advance of the web 1 through a distance (e.g., 0.2 mm) of preselected unit length. The disc 6 is illuminated from within or from behind so that a light beam can impinge upon the transducer 7 after such light beam has passed through a slot 6A.

It will be readily appreciated that the illustrated pulse generator constitutes but one form of means which can be resorted to for tracking the progress of a perforation P. For example, the disc 6 and transducer 7 can be replaced with a tracking device which is similar or identical with the monitoring means including the light source 10, light conductor 8 and sensor 9. The disc 6 is then replaced with a rotary body which is driven in synchronism with the drum 4 and has a peripheral surface whereon strongly reflecting increments alternate with increments whose reflectivity is low or nil.

Still further, the pulse generator 6, 7 or an analogous tracking device need not be installed in the housing 2. This is advantageous because a tracking device which is not installed in the housing 2 can utilize any suitable source of light, e.g., artificial light which would cause undesirable exposure of unexposed portions of the web 1 or distortion of images which are already exposed on the web entering the housing 2. For example, the shaft 4B of the drum 4 can extend from the housing 2 and the disc 6 is then mounted on such shaft outside of the housing. This means that the slots 6A of the disc 6 can transmit daylight or any other visible light since such light cannot reach the web 1 in the housing 2.

The imaging device Im is adjacent to that portion of the path for the web 1 which is located downstream of the monitoring means 8–10. This imaging device comprises the aforementioned casing 13 for the sample 12. The casing 13 further supports an objective which focuses the image of the sample 12 upon the marginal portion MP when a predetermined field of such marginal portion reaches the imaging station, i.e., when the perforation P which has caused the sensor 9 to transmit a (first) signal has advanced through a predetermined distance beyond the monitoring station and beyond the transducer 7 of the pulse generator. The casing 13 also contains a flash unit including a tube 14 which is mounted in front of a reflector 15 and transmits light which illuminates the sample 12 via adapter filter means 16 when the imaging device Im is actuated in response to a signal from the output d of the computer 24. The signal which is transmitted by the output d via conductor means 19 serves to connect the flash unit 14 in circuit with a suitable energy source 20. The latter is connected with the flash unit 14 by conductor means 21.

The housing 2 contains or carries guide rails or tracks 13B for corresponding followers 13A of the casing 13. The tracks 13B extend at right angles to the plane of FIG. 1, i.e., in parallelism with the axis of the drum 4. This enables the casing 13 to move the objective 11 into register with the path of movement of perforations P of a relatively wide, narrower or narrowest web, depending on the number of different types of webs which are to be provided with test exposures. It is assumed that the casing 13 is movable between two different positions, and the means for moving the casing between such positions receives signals from the output e of the computer 24 via conductor means 25. The moving means comprises an electromagnet 23 whose armature 23A is articulately connected with one arm of a bell crank lever 22 the other arm of which is articulately connected with the casing 13. The lever 22 is fulcrumed in the housing 2. The casing 13 moves to a first position in response to energization and to a second position in response to deenergization of the electromagnet 23. It is clear that the illustrated moving means can be replaced by an arrangement which can move the casing 13 axially of the drum 4 between more than two different positions.

The exact details of the computer 24 (which can constitute a commercially available unit) form no part of the invention. This computer performs a number of functions including the following: Its input a receives first signals from the sensor 9 via conductor means 17 and the computer 24 stores such signals. The input b of the computer 24 receives second signals from the transducer 7 of the pulse generator. The computer 24 may comprise a conventional shift register which transports a first signal in response to reception of each second signal so that the first signal is transmitted to the output d and causes the flash unit 14 to illuminate the sample 12 when the input b receives a predetermined number of second signals, i.e., when the perforation P whose detection resulted in the generation of a first signal has advanced through a predetermined distance beyond the base 8A of the light conductor 8. The flash unit 14 is fired to initiate the exposure of the sample 12 onto the marginal portion MP or onto another portion of the web 1 at the exact moment when a preselected part or field of the marginal portion MP (or another portion of the web 1) is adjacent to the objective 11. Since the flash which is furnished by the unit 14 is short or extremely short (as compared with the peripheral speed of the drum 4), the area of the blurred portion of each image of the sample 12 is extremely small and does not affect the detectability of the test exposure, especially since the copying machine normally evaluates the central (i.e., the sharpest) portion of each developed test exposure.

The computer 24 may also comprise a counter which is started in response to reception of a first signal via conductor means 17 and transmits a signal via conductor means 19 in response to reception of a predetermined number of second signals via conductor means 18.

Since the area of fields for the application of test exposures is invariably small, it is necessary to employ an illuminating device which can expose images of small samples or which can reduce the images of samples to a size which fits onto the selected field of a web 1. Therefore, the objective 11 is preferably an optical unit which reduces the image of the sample 12. In such imaging device, the objective 11 also serves to concentrate the major portion of or the entire light furnished by the unit 14 in the course of a test exposure.

The operation is as follows:

The leader of the foremost web 1 which is to be advanced through the housing 2 is connected to a strip which is threaded through the apparatus and pulls the foremost web into and through the housing 2. Since the housing is lightproof, and in order to avoid manual adjustment of the computer 24, the arrangement is preferably such that all components of the monitoring means are operative when the leader of the web 1 enters the housing 2. The computer 24 ascertains that sensor which begins to transmit unmistakable (first) signals denoting that the particular sensor has detected one or more perforations P in the marginal portion MP of a web 1 of certain width, e.g., in the web 1 which is shown in FIG. 2 and is guided by the widest groove 3a of the roll 3. The output e of the computer 24 then transmits a signal to energize or deenergize the electromagnet 23 and to thereby move the casing 13 to a position in which the objective 11 is adjacent to the path of perforations P of the web 1 which is shown in FIG. 2. Thus, the computer 24 can automatically select the position of the imaging device Im in such a way that the apparatus is set for the application of test exposures to webs which are being supplied by the magazne Ma.

The detection of foremost perforation P in the marginal portion MP of the web 1 shown in FIG. 2 results in the generation of a first signal (by the sensor 9), and such signal is transmitted to the first stage of the aforementioned shift register in the computer 24. The first signal is transported from stage to stage of the shift register by second signals which are transmitted by the transducer 7, and the first signal ultimately reaches and issues from the last stage of the shift register to complete the circuit including the flash unit 14 and the energy source 20 so that the sample 12 is imaged onto a predetermined portion of the moving web 1.

As mentioned above, the computer 24 can be designed in such a way that it transmits a signal to the first stage of the shift register in response to detection of each and every perforation P. Alternatively, the computer 24 can process each $n^{th}$ (e.g., each third) first signal. This depends on the number of perforations in the marginal portion of a web, i.e., on the nature of film which is to be provided with test exposures. As also mentioned hereinabove, the apparatus can be designed for the making of exposures on "110", "126" or "135" photographic films.

The improved apparatus is susceptible of many additional modifications without departing from the spirit of the invention. For example, and as shown in FIG. 3, the drum 4 can be replaced by a drum-shaped rotary element 204 which is hollow, either in part or entirely, and has a transparent or translucent cylindrical rim 204R. The drum 204 is mounted on a shaft 204B in cantilever fashion and its interior accommodates a light source 210 located opposite one or more sensors 209, 209′, depending on the number of web types which are to be provided with test exposures. The illustrated sensors 209 and 209′ are offset with respect to each other, as considered in the axial direction of the drum 204 so that each thereof can transmit signals in response to detection of perforations in webs having different widths. The light source 210 preferably emits infrared light. The web which is trained over the rim 204R does not transmit infrared light; however, when a perforation moves between the light source 210 and the sensor 209 or 209', the sensor transmits a readily detectable first signal to the corresponding input of the computer, not shown in FIG. 3.

An important advantage of all embodiments of the improved apparatus is that the latter can apply test exposures to any desired preselected field of a web and in such a way that each field is located at a predetermined distance from and is disposed in predetermined orientation with respect to the corresponding perforation. The test exposures can be made close to or they may be remote from a margin of the web.

Another advantage of the apparatus is that the test exposures can be made while the web is in motion. This is attributable to the provision of an imaging device which employs a flash unit. While it is also possible to employ imaging devices with other types of light sources, a flash unit is preferred at this time because it insures the making of sharp test exposures even while the web is transported at a high speed, i.e., the output of the machine which embodies or is combined with the improved apparatus need not be reduced for the purpose of insuring the making of acceptable test exposures.

The computer 24 may be a microprocessor type 8085 a marketed by Intel AS.

Test exposures which are applied by the apparatus of the present invention can be evaluated in apparatus of the type disclosed in commonly owned copending application Ser. No. 5,514 filed Jan. 22, 1979 by Siegfried Thurm et al.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. Apparatus for making test exposures on previously unexposed portions of a perforated web of photographic material, particularly on unexposed marginal portions of color photographic films with exposed film frames, comprising means for continuously advancing the web lengthwise along a predetermined path; signal generating means for monitoring the continuously advancing web for the presence of perforations in a first portion of said path; stationary imaging means including a flash unit actuatable to expose the image of a sample onto an unexposed portion of the continuously advancing web in a second portion of said path downstream of said first portion; and control means interposed between said monitoring means and said imaging means to actuate said imaging means with a delay which follows the generation of a first signal denoting the detection of a selected perforation and during which the selected perforation advances through a predetermined distance along said path, including pulse generator means operative to transmit second signals in response to movement of the web through unit distances along said path, and means for processing said first and said second signals.

2. Apparatus as defined in claim 1, wherein said advancing means comprises a rotary element having a peripheral surface which is contacted by the web along an arc of approximately 180 degrees.

3. Apparatus as defined in claim 2, wherein said peripheral surface is a smooth circular cylindrical surface.

4. Apparatus as defined in claim 2, wherein said advancing means further comprises first and second rotary guide members flanking said rotary element, said web being trained around one of said guide members, thereupon around said rotary element and then around the other of said guide members.

5. Apparatus as defined in claim 4 for applying test exposures to a plurality of different webs each having one of a plurality of different widths, wherein at least said first guide member has a plurality of circumferential grooves each having a different width corresponding to one of said plurality of widths.

6. Apparatus as defined in claim 5, wherein each groove of lesser width is confined in a groove of greater width.

7. Apparatus as defined in claim 2 for applying test exposures to a plurality of different webs each having one of a plurality of different widths, wherein said peripheral surface has a plurality of circumferential grooves each having a different width corresponding to one of said plurality of widths.

8. Apparatus as defined in claim 7, wherein each groove of lesser width is confined in a groove of greater width.

9. Apparatus as defined in claim 1, wherein said processing means includes a counter for said second signals.

10. Apparatus as define in claim 1, wherein said imaging means comprises an objective for focusing the image of said sample onto the moving web, and a light source which is actuatable by said control means to illuminate said sample in delayed response to the generation of a signal.

11. Apparatus as defined in claim 10, wherein said imaging means further comprises filter means interposed between said flash unit and said sample.

12. Apparatus as defined in claim 1, wherein said advancing means comprises a rotary element having a peripheral surface which is contacted by the web, and further comprising means for moving said sample substantially axially of said rotary element between a plurality of predetermined positions.

13. Apparatus as defined in claim 1, wherein said imaging means comprises an optical system for focusing a reduced image of said sample onto the moving web.

14. Apparatus as defined in claim 1, further comprising a light-tight enclosure for said advancing, imaging and monitoring means.

15. Apparatus as defined in claim 14, wherein said enclosure forms part of a machine for development of photosensitive material.

16. Apparatus as defined in claim 14, wherein said enclosure forms part of a machine for splicing webs of exposed photosensitive material.

17. Apparatus for making test exposures on previously unexposed portions of a perforated web of photographic material, particularly on unexposed marginal portions of color photographic films with exposed film frames, comprising means for advancing the web lengthwise along a predetermined path, including a hollow rotary element having a peripheral surface which is contacted by the web along an arc of approximately 180° and a light-transmitting rim; signal generating means for monitoring the advancing web for the presence of perforations in a light portion of said path, including a light source at one side of said rim and a signal generating optoelectrical transducer at the other side of said rim, said transducer being located in the path of light issuing from said source in line with the perforations of the web; imaging means actuatable to expose the image of a sample onto an unexposed portion of the web in a second portion of said path downstream of said first portion; and control means interposed between said monitoring means and said imaging means to actuate said imaging means with a delay which follows the generation of a signal denoting the detection of a selected perforation and during which the selected perforation advances through a predetermined distance along said path.

18. Apparatus as defined in claim 17, wherein said source emits infrared light.

19. Apparatus as defined in claim 17, further comprising at least one additional transducer at said other side of said rim opposite said source, said one additional transducer being offset with respect to said first mentioned transducer as considered in the axial direction of said rotary element.

20. Apparatus for making test exposures on previously unexposed portions of a perforated web of photographic material, particularly on unexposed marginal portions of color photographic films with exposed film frames, comprising means for advancing the web lengthwise along a predetermined path, including a rotary element having a peripheral surface which is contacted by the web along an arc of approximately 180° and which reflects light; signal generating means for monitoring the advancing web for the presence of perforations in a first portion of said path, including a light source arranged to direct a beam of light against the advancing web in the region of perforations, and signal generating transducer means positioned in the path of light which is reflected by said surface through successive perforations: imaging means actuatable to expose the image of a sample onto an unexposed portion of the web in a second portion of said path downstream of said first portion; and control means interposed between said monitoring means and said imaging means to actuate said imaging means with a delay which follows the generation of a signal denoting the detection of a selected perforation and during which the selected perforation advances through a predetermined distance along said path.

21. Apparatus as defined in claim 20, wherein said monitoring means further comprises a substantially Y-shaped light conductor having a first branch adjacent said source, a base adjacent to the path of perforations and a second branch adjacent to said transducer means.

22. Apparatus as defined in claim 20, wherein said source emits infrared light.

23. Apparatus as defined in claim 20, wherein said monitoring means further comprises at least one additional transducer means which is offset with respect to said first mentioned transducer means as considered in the axial direction of said rotary element.

24. Apparatus for making test exposures on previously unexposed portions of a perforated web of photographic material, particularly on unexposed film frames, comprising means for advancing the web lengthwise along a predetermined path, including a rotary element having a peripheral surface which contacts the web; signal generating means for monitoring the advancing web for the presence of perforations in a first portion of said path; imaging means actuatable to expose the image of a sample onto an unexposed portion of the web in a second portion of said path downstream of said first portion; and control means interposed between said monitoring means and said imaging means to actuate said imaging means with a delay which follows the generation of a signal denoting the detection of a selected perforation and during which the selected perforation advances through a predetermined distance along said path, including pulse generator means operative to transmit second signals in response to movement of the web through unit distances along said path, and means for processing said first mentioned signals and said second signals, said pulse generator means comprising a circumferentially slotted disc which rotates in synchronism with said rotary element and photoelectric transducer means operative to transmit said second signals in response to detection of successive slots in said disc.

* * * * *